Aug. 11, 1953 P. B. CANDELA 2,648,265
APPARATUS FOR INTRODUCING CUT FILM INTO CAMERAS
Filed June 19, 1950 2 Sheets-Sheet 1

POMPEO B. CANDELA,
INVENTOR.

BY Hazard & Miller
ATTORNEYS

Aug. 11, 1953      P. B. CANDELA      2,648,265
APPARATUS FOR INTRODUCING CUT FILM INTO CAMERAS
Filed June 19, 1950      2 Sheets-Sheet 2
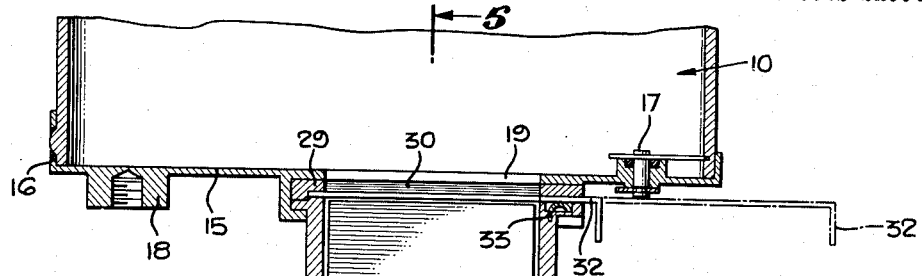
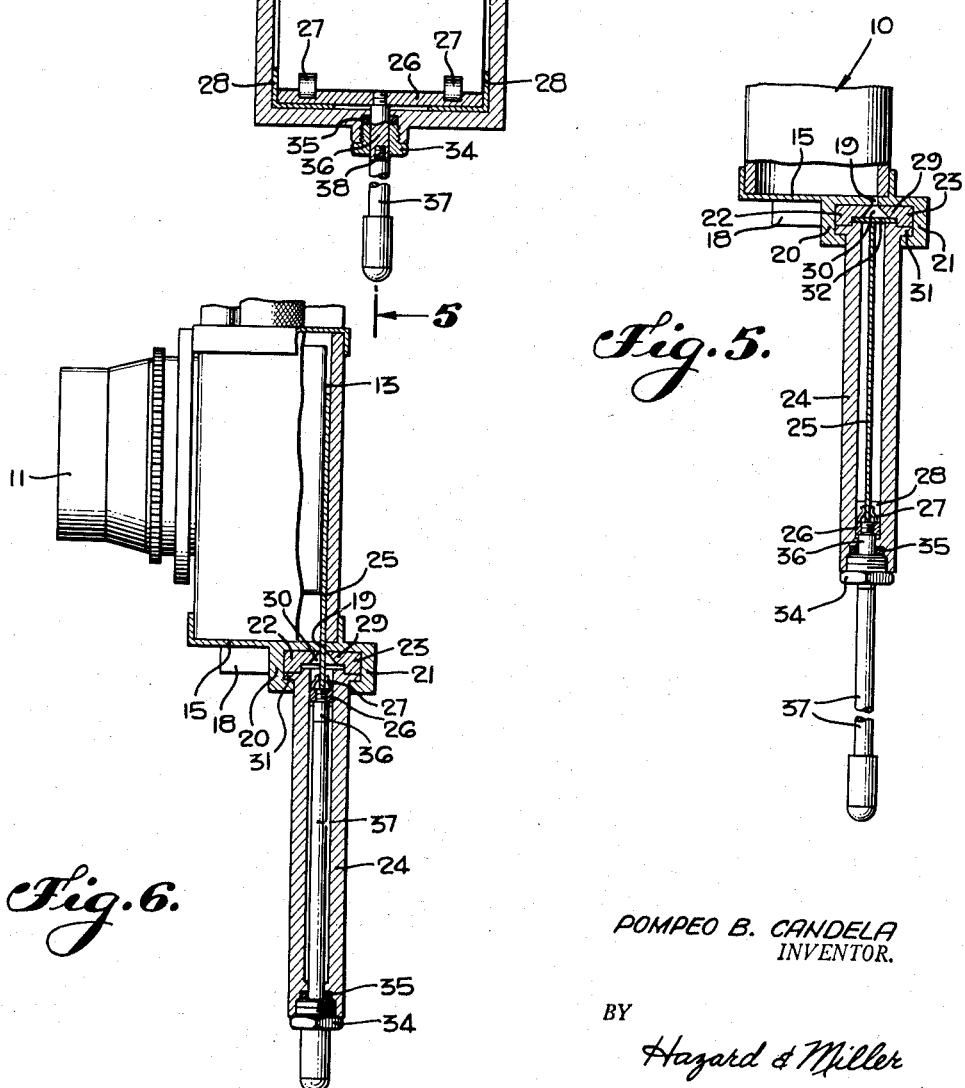
POMPEO B. CANDELA
INVENTOR.
BY
Hazard & Miller
ATTORNEYS Patented Aug. 11, 1953

2,648,265

UNITED STATES PATENT OFFICE 2,648,265

APPARATUS FOR INTRODUCING CUT FILM INTO CAMERAS

Pompeo B. Candela, San Bernardino, Calif.

Application June 19, 1950, Serial No. 169,050

1 Claim. (Cl. 95—11)

This invention relates to improvements in photograph cameras and particularly to that type of camera popularly referred to as a candid camera although the invention is not necessarily restricted thereto.

Explanatory of the present invention, a number of cameras now on the market are designed to use strip film of eighteen or thirty-six frames in length, the film being introduced into the camera in a wound roll on a spool and progressively drawn therefrom across the focal plane of the camera onto a wind-up spool. Exemplary of a camera of this type is the "Leica." An objection to such cameras resides in the length of film that the camera is designed to hold in that if a given roll of film is introduced into the camera, all pictures must be taken under conditions or circumstances to meet the requirements of the characteristics of that particular roll of film. If the photographer has occasion to take a picture requiring the use of a different type of film after only a few pictures have been taken on the roll that is in the camera, it is impossible for him to change the film in the camera without wasting the remaining unused frames on the film strip. Many users of cameras of this type have occasion to take many different types of pictures wherein the use of various films having different emulsion characteristics are desired to be used and an object of the present invention is to provide an apparatus applicable to a camera of this type which will enable sections of cut film or individual frames of film to be inserted into the camera at the focal plane for exposure and then removed therefrom. In this manner a single frame of film can be introduced into the camera and exposed and removed therefrom and thereafter another frame or section of cut film, having an entirely different emulsion characteristic, can be introduced into the camera, exposed and removed therefrom, thus making the use of the camera very much more versatile and avoiding the wastage of film in the camera when it is desired to replace a given film with another film having different emulsion characteristics.

An additional advantage obtainable with a camera embodying the present invention resides in the ability of the photographer to insert a single frame of film into the camera under daylight conditions to expose it, withdraw it therefrom, and to develop and print such single photographs which may be urgently needed or desired without involving a sacrifice of unused film in the camera.

In scientific and industrial usage of cameras of this type occasion frequently occurs that a very large number of photographs are to be made under standardized or predetermined conditions of exposure using film of either standard or special emulsions, such as for example infra-red film. The present invention permits the making of quick and economical test pictures consuming only a few frames of sheet film of the desired variety to determine whether or not the film meets the conditions or whether the conditions should be altered in order to obtain the best pictures with the film selected.

More specifically, an object of the invention is to provide an adapter that can be used to replace the removable wall of a conventional camera such as a Leica and to which is applicable any of a series of magazines, each magazine containing a frame or section of cut film of the desired emulsion characteristics. These magazines may be selectively applied to and detached from the adapter and when in applied position they enable the sections of cut film therein contained to be moved into the camera under daylight conditions and located on the focal plane thereof and, after exposure, to be removed therefrom, provision being made to protect the cut film from inadvertent or accidental exposure during the insertion and removal. In this manner the photographer may carry with him a series of magazines having frames or sections of cut film loaded therein and can select the magazine containing film having the desired emulsion characteristics, apply the magazine to the adapter, introduce the film into the camera, expose it, and then withdraw the film into the magazine and finally remove the magazine from the adapter. Thus by being properly equipped with a suitable number of magazines loaded with sections of cut film of different characteristics, the photographer may use his camera to meet any ordinary conditions and select the desired film to meet these conditions.

Still another object of the invention is to provide a construction which will not involve a remodeling or mutilation of the conventional camera and which can be removed if desired to allow the removable wall of the camera to be replaced thereon so that the camera can be used with the roll or strip film if the photographer so desires.

With the foregoing and other objects in view, which will be made manifest in the following detailed description and specifically pointed out in the appended claim, reference is had to the accompanying drawings for an illustrative embodiment of the invention, wherein:

Fig. 4 is a vertical section taken substantially upon the line 4—4 of Fig. 3;

Fig. 5 is a vertical section taken substantially upon the line 5—5 upon Fig. 4, the film in the magazine being shown therein prior to its introduction into the camera; and Fig. 6 is a view similar to Fig. 5 but illustrating the cut film as having been introduced from the magazine into the camera.

Figure 1:
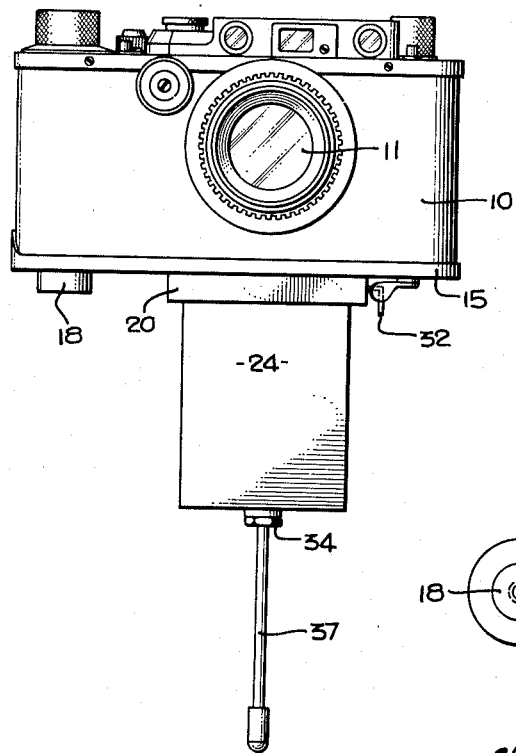
Figure 1 is a view in front elevation of a candid camera illustrating the adapter and magazine embodying the present invention in applied position thereon.
Figure 2:
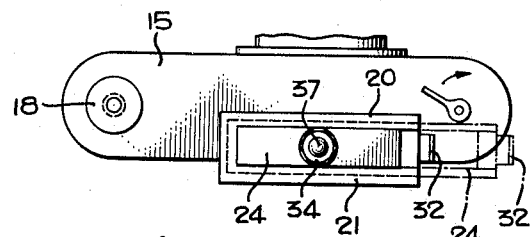
Fig. 2 is a bottom plan view of the camera as shown in Fig. 1.
Figure 3:
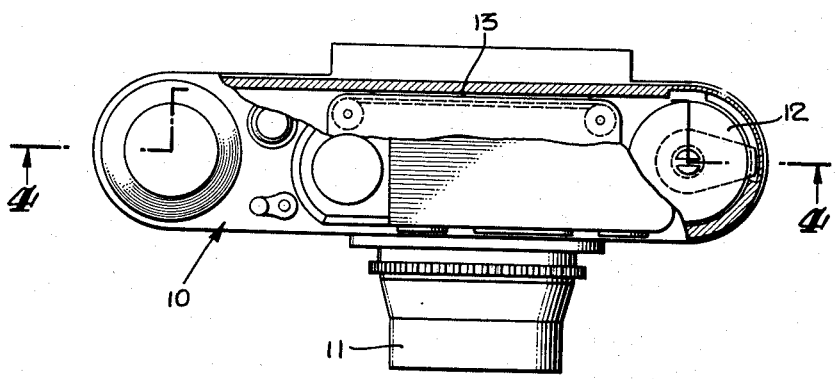
Fig. 3 is a top plan view of the camera shown in Fig. 1, parts being broken away and illustrated in horizontal section.

Referring to the accompanying drawings wherein similar reference characters designate similar parts throughout, the camera illustrated is a conventional camera of the candid type consisting generally of a housing 10 having a lens 11. The housing 10 in the conventional camera is designed to receive two spools, one of which is indicated at 12. These spools are normally disposed at opposite ends of the housing 10, one spool constituting a loading spool on which a supply of unexposed film is wound, and the other spool constituting a wind-up spool which winds up the exposed film after it has been drawn across the focal plane of the camera, indicated at 13, and exposed through the lens 11. In many such cameras the frames of film at the time of exposure are confined on the focal plane indicated at 13 between the back wall of the housing 10 and a focal plane shutter located shortly in advance of the back wall of the housing. The spools 12 and the film thereon are introduced into the camera and are removed therefrom by removing the bottom wall of the housing 10. In some cameras, the removable wall of the housing consists of the bottom and the back of the housing, or a portion thereof. After the spools have been introduced into the camera the bottom wall is replaced on the body of the housing and is locked in place. Conversely, to remove the spools the bottom wall is detached from the housing 10 and the spools can be removed through the open bottom.

As previously explained, cameras of this type are designed to hold spools of film having either eighteen or thirty-six frames thereon and if the user of the camera has installed in the camera film of a given type, he must either continue to use that type of film in the taking of all of the eighteen or thirty-six exposures or he must waste film by effecting a substitution prior to a given roll being used up in order to obtain finished pictures immediately.

In accordance with the present invention an adapter 15 is provided. This adapter may generally conform to the removable bottom or other removable portion of the housing 10 in that it has means, indicated at 16 and 17, for locking itself onto the housing in the same manner as the removable bottom of the housing is locked on. In addition, it may be equipped with a boss internally threaded as at 18 to serve as a tripod mount. The adapter differs from the conventional bottom of the camera housing in that it has an elongated slot 19 arranged in alignment with the focal plane 13 of the camera. This slot is equal in length or may slightly exceed the length of a frame. The width of the slot 19 is such that a section of cut film can be readily passed therethrough. On the opposite sides of this slot there are formed channel-shaped guides or rails 20 and 21 which are designed to slidingly receive flanges, generally indicated at 22 and 23, on the sides of a magazine 24. Each magazine consists of a relatively flat container of such size and shape as to contain one frame or section of cut film, indicated at 25. In the bottom of the container there is disposed a film holder consisting of a bar 26 which extends across the bottom of the container and which has resilient clips 27 mounted thereon between which the bottom edge of the film section 25 can be inserted. The bar 26 also preferably has upstanding ends 28 which bear against the side edges of the section 25 so that the film will be effectively centered with relation to the bar 26 and with relation to the container 24. At the top of the container 24 there is an outlet provided by the cover 29 which has a tapered opening 30 adapted to register with the slot 19 in the adapter. The sides of this cover cooperate with flanges 31 on the sides of the container 24 to form the flanges 22 and 23. The cover 29 may be detachably fastened to the container 24 in any suitable manner and cooperates therewith to provide ways for a slidable closure 32. This slidable closure may assume a position closing the top of the container 24, as illustrated in full lines on Fig. 4, or it may assume an opening position, as illustrated in dotted lines on Fig. 4. A light trap 33 slidably engages the closure 32 to prevent ingress of light to the magazine during the opening or closing of the closure 32. The bottom of the container 24 has a threaded bushing 34 therein which confines a light trap 35 which may be in the form of a rubber O-ring that slidably engages a stud 36 that is threaded into the bar 26. A handle 37 is threadedly connected, as at 38, to the stud 36 and this handle may be detached from the stud of a given magazine and applied to the corresponding stud of any of a series of similar magazines all of which can be applied to the adapter.

The various magazines may be loaded in a darkroom with sections of cut film 25 by pushing the bar 26 to the open end of the magazine and engaging the bottom edges of the frame of cut film in the clips 27 and then withdrawing the bar 26 back into the magazine. When the magazines have been loaded their closures 32 are closed and the photographer or camera user may carry the loaded magazines with him until it is desired to use the film therein contained. The film with which the various magazines are loaded may possess different emulsion characteristics and the exteriors of the magazines may be suitably marked to indicate the nature of the film contained therein. To take a picture under given conditions the appropriate magazine containing the desired film is selected and is applied to the adapter by sliding it in the channel ways 20 and 21. When in applied position the closure 32 is caused to assume the dotted line open position shown in Fig. 4, thus opening the outlet from the magazine to the slot 19. The handle 37 can then be pushed upwardly causing the bar 26 to introduce the section of cut film into the camera through the slot 19. The section of cut film will then pass upwardly into the housing 10 and occupy a position on the focal plane of the camera between the back wall of the housing 10 and the focal plane shutter or other structure that serves to guide the film between the leading roll and the wind-up roll when strip film is used. With the section 25 thus introduced into the housing 10 and occupying a position on the focal plane thereof, the film may be exposed by operating the shutter in the conventional manner. When the exposure is completed the handle 37 is drawn downwardly causing the bar 26 and clips 27 to retract the cut film section into the magazine. The closure 32 may then be caused to assume its closed position, shown in full line on Fig. 4, and the magazine can then be removed from the adapter by sliding it out of the channel ways 20 and 21.

If the taking of a subsequent picture having different emulsion characteristics is desired the magazine containing the desired film can be applied to the camera and the film introduced, exposed and withdrawn in the same manner. In using a subsequent magazine the handle 37 is detached from the magazine containing the exposed film and applied to the stud of the new magazine.

If the user of the camera desires to return to the use of strip film, the adapter 15 can be removed and the bottom wall forming part of the camera can be re-applied to the housing thus restoring the camera to its initial condition.

From the above described construction it will be appreciated that the improved adapter and the magazines associated therewith can be readily applied to and removed from a conventional camera and when applied the use of individual frames or sections of cut film having desired emulsion characteristics can be optionally used with the camera, thus avoiding the wastage of strip film when it is desired to take pictures under varying conditions requiring the use of different types of film, or when it is necessary to proceed immediately in the processing of photographs which may be urgently needed.

Various changes may be made in the details of the construction without departing from the spirit and scope of the invention as defined by the appended claim.

I claim:

Apparatus for introducing cut film into a candid camera comprising a wall to be releasably attached to said camera, said wall having a slot therein in alignment with the focal plane of said camera, a U-shaped bracket integral with said wall, a hollow, elongated frame open at one end, flanges integral with the frame and adapted to be slidably received by said bracket, said flanges defining the open end of said frame, film-guiding means formed in the flanges in registration with said slot and said open end, a chamber in one flange, a light stopper secured in said chamber, reciprocable means carried by the flanges for partitioning said open end from said film-guiding means when the apparatus is not in use, said reciprocable means being in contacting relationship with said light stopper, and means within the frame for advancing film into the camera through the open end, film-guiding means, slot, and retracting the same.

POMPEO B. CANDELA.

References Cited in the file of this patent

UNITED STATES PATENTS

| Number | Name | Date |
| --- | --- | --- |
| 52,239 | Wright | Jan. 23, 1866 |
| 306,618 | Hough | Oct. 14, 1884 |
| 341,886 | Collins | May 18, 1886 |
| 562,544 | Landsing | June 23, 1896 |
| 1,222,310 | Lichtman | Apr. 10, 1917 |
| 1,494,294 | Sheridan | May 13, 1924 |
| 2,237,656 | Covell | Apr. 8, 1941 |
| 2,378,406 | Harris | June 19, 1945 |

FOREIGN PATENTS

| Number | Country | Date |
| --- | --- | --- |
| 19,164 | Great Britain | of 1904 |
| 698,624 | Germany | Nov. 14, 1940 |